(12) United States Patent  
Hosokawa et al.

(10) Patent No.: US 8,527,966 B2  
(45) Date of Patent: Sep. 3, 2013

(54) SOURCE CODE INSPECTION METHOD AND SYSTEM

(75) Inventors: Nobuhiro Hosokawa, Tokyo (JP); Yuka Mori, Tokyo (JP); Miwako Naoi, Tokyo (JP); Kazutaka Yamasaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/561,339

(22) Filed: Sep. 17, 2009

(65) Prior Publication Data

US 2011/0067009 A1    Mar. 17, 2011

(51) Int. Cl.
*G06F 9/44* (2006.01)
*G06F 9/45* (2006.01)
*G06F 11/36* (2006.01)

(52) U.S. Cl.
CPC . *G06F 8/20* (2013.01); *G06F 8/433* (2013.01); *G06F 11/3676* (2013.01); *G06F 8/10* (2013.01); *G06F 8/434* (2013.01)
USPC .......................... 717/132; 717/144; 717/156

(58) Field of Classification Search
None
See application file for complete search history.

(56) References Cited

U.S. PATENT DOCUMENTS

| 2003/0041159 | A1* | 2/2003 | Tinsley et al. | 709/231 |
| 2007/0220486 | A1* | 9/2007 | Lammel et al. | 717/114 |
| 2009/0144698 | A1* | 6/2009 | Fanning et al. | 717/120 |

FOREIGN PATENT DOCUMENTS

| JP | 9212387 | 8/1987 |
| JP | 5282141 | 10/1993 |
| JP | 2003029970 | 1/2003 |

OTHER PUBLICATIONS

"Applying Software Complexity Metrics to Program Maintenance", Author: Harrison et al., Published by IEEE, Publicatoin Date: Sep. 1982, pp. 65-79.*
"A critique of cyclomatic complexity as a software metric", Author: Martin Sheppard, Published by Software Engineering Journal, Publicatoin Date: Mar. 1988, pp. 30-36.*
"Cyclomatic Complexity Density and Software Maintenance Productivity", Gill et al., Published by IEEE, Publicatoin Date: vol. 17, No. 12, Dec. 1991, pp. 1284-1288.*
Srinivas Talluri, Data Envelopment Analysis: Models and Extensions, Decision Line, May 2000, pp. 8-11.

* cited by examiner

*Primary Examiner* — Elias Mamo
*Assistant Examiner* — Christopher Bartels
(74) *Attorney, Agent, or Firm* — Schmeiser, Olsen & Watts; John Pivnichny

(57) ABSTRACT

A source code inspection method and system. The method includes receiving by a computing system, source code files associated with a specified project. The computing system retrieves metrics data comprising software metrics associated with the source code files. The computing system generates first evaluation scores associated with the source code files. The computing system generates and presents to a user, a graph displaying the first evaluation scores. The computing system calculates parameter values associated with an evaluation function used to calculate second evaluation scores associated with the source code files. The computing system calculates the second evaluation scores by enabling the evaluation function using the parameter values. The computing system generates and presents to the user, a second graph displaying the second evaluation scores.

18 Claims, 5 Drawing Sheets

SOURCE CODE INSPECTION METHOD AND SYSTEM

FIELD OF THE INVENTION

The present invention relates to a method and associated system for using multiple metrics to inspect source code for defects.

BACKGROUND OF THE INVENTION

Identifying defective data typically comprises an inefficient process with little flexibility. Accordingly, there exists a need in the art to overcome at least some of the deficiencies and limitations described herein above.

SUMMARY OF THE INVENTION

The present invention provides a method comprising:
receiving, by a computing system, a set of source code files associated with a specified project;
retrieving, by said computing system, metrics data comprising software metrics associated with said source code files;
generating, by said computing system, a set comprising said software metrics;
generating, by said computing system based on said software metrics, first evaluation scores associated with said source code files;
generating, by said computing system, a first graph displaying said first evaluation scores;
first presenting, by said computing system to a user said first graph;
receiving, by said computing system from said user in response to said first presenting, a selection of a first source code file of said source code files;
calculating, by said computing system based on said first source code file, parameter values associated with an evaluation function used to calculate second evaluation scores associated with said source code files;
generating, by a computer processor of said computing system, said second evaluation scores, wherein said generating said second evaluation scores comprises enabling said evaluation function using said parameter values;
generating, by said computing system, a second graph displaying said second evaluation scores; and
second presenting, by said computing system to said user, said second graph.

The present invention provides a method comprising:
receiving, by a computing system, a first set of source code files associated with a specified project;
retrieving, by said computing system, first metrics data comprising first software metrics associated with said first source code files;
generating, by said computing system, a first set comprising said first software metrics;
generating, by said computing system, first evaluation scores associated with said first source code files;
generating, by said computing system, a first graph displaying said first evaluation scores;
first presenting, by said computing system to a user said first graph;
retrieving, by said computing system, a list of reference projects;
second presenting, by said computing system to said user, said list of reference projects;
receiving, by said computing system from said user in response to said second presenting, a selection for a first reference project of said list of reference projects;
retrieving, by said computing system, second metrics data comprising second software metrics associated with second source code files associated with said first reference project;
generating, by said computing system based on said second source code files associated with said first reference project, parameter values associated with an evaluation function used to calculate second evaluation scores and third evaluation scores associated with said first source code files and said second source code files;
generating, by a computer processor of said computing system, said second evaluation scores, wherein said generating said second evaluation scores comprises enabling an evaluation function using said parameter values and said second software metrics;
generating, by said computing system, a second graph displaying said second evaluation scores; and
third presenting, by said computing system to said user, said second graph.

The present invention advantageously provides a simple method and associated system capable of identifying defective data.

DETAILED DESCRIPTION OF THE INVENTION

Figure 1:
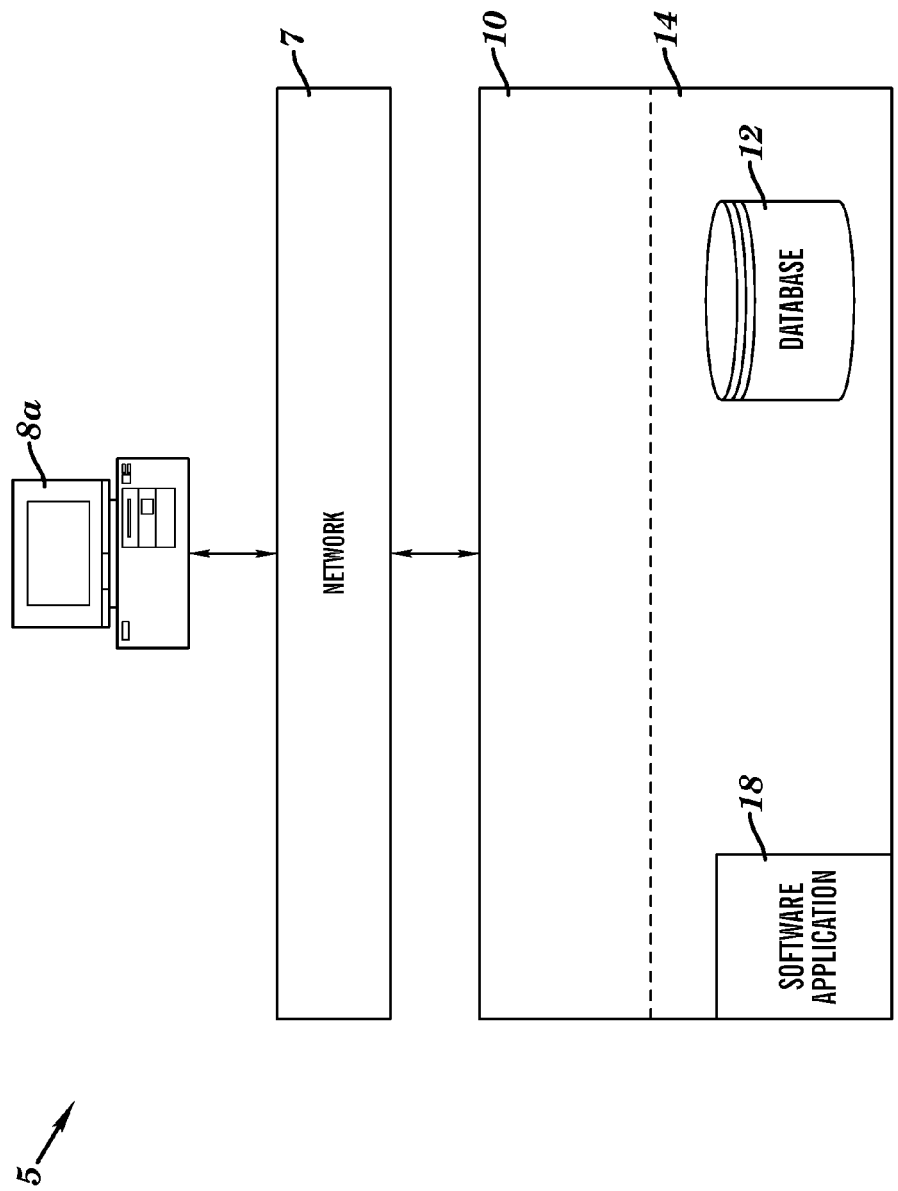
FIG. 1 illustrates a system for inspecting source code during software development, in accordance with embodiments of the present invention.

FIG. 1 illustrates a system 5 for inspecting source code during software development, in accordance with embodiments of the present invention. Software development may be expressed as a V-shaped lifecycle model, starting from a requirements specification followed by system design, implementation, unit testing, system testing, and user acceptance testing. During software development, source code is inspected for defects. Source code is defined herein as program instructions (in an original format) that must be translated by a compiler, interpreter, or assembler into object code. One method used to determine defects in source code includes measuring software metrics for each source code file (i.e., of multiple source code files) and based on the measured metrics, source code files comprising defects may be located. A software metric is defined herein as a measure of a property or specification of a portion of software. Software metrics may include, inter alia, line of code metrics (e.g., number of lines, number of operators, number of line of comments,)

error count metrics (e.g., number of errors and error density,) McCabe software metrics (e.g., cyclomatic complexity and decision density,) etc. Multiple metrics may be used for selecting source code files for inspection. System 2 enables an evaluation function used to analyze multiple metrics and compares an obtained score with a pre-set threshold in order to select source code files for inspection. System 2 provides a means to adjust an evaluation function of a source code file for inspection.

Figure 2:
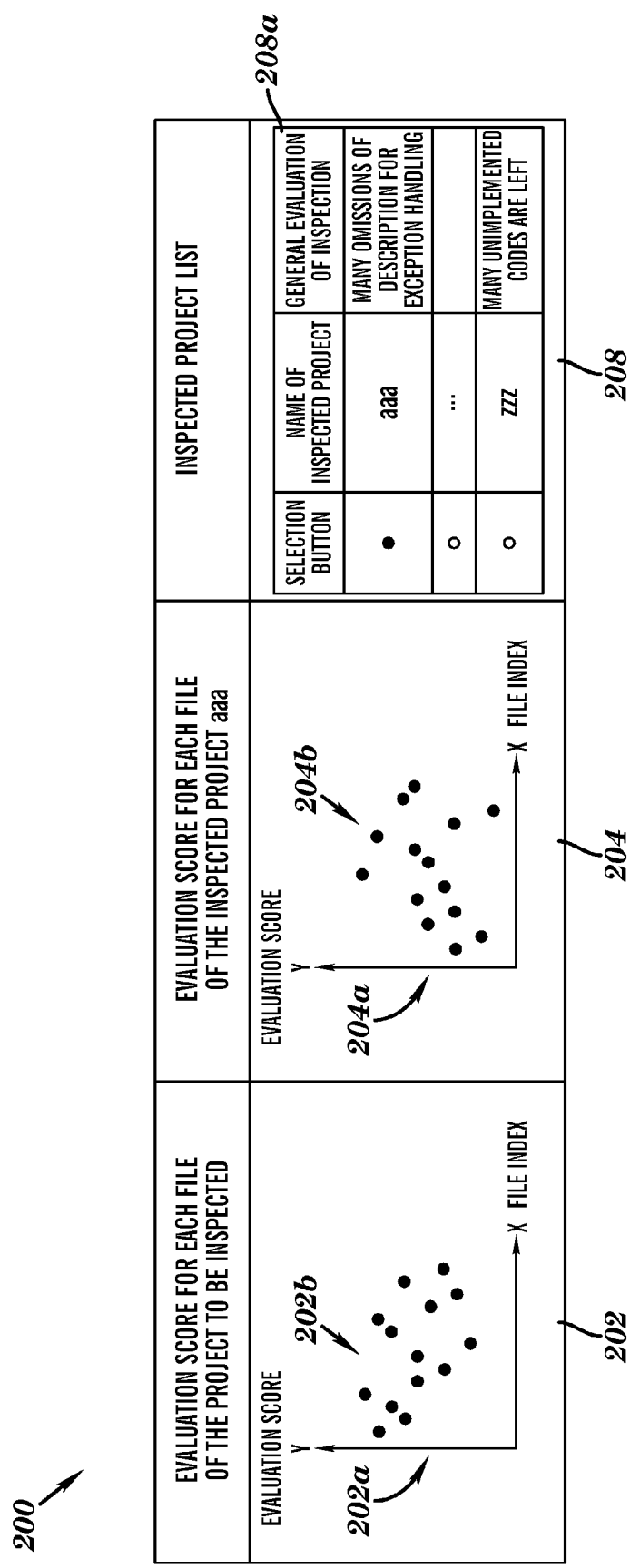
FIG. 2 illustrates a user interface used to enable the system of FIG. 1 for inspecting source code and determining defective source code files, in accordance with embodiments of the present invention.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., selecting a source code file, selecting a past project, viewing source code files, viewing evaluation score graphs as illustrated in FIG. 2, etc) computing system 10. Computing system 10 may comprise any type of computing system(s) including, inter alia, a personal computer (PC), a server computer, a database computer, etc. Computing system 10 is used to retrieve data from computing apparatus 8a and using multiple metric to inspect source code for defects. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8a such as, inter alia, source code files, metrics data, etc) and any generated data (e.g., evaluation scores, graphs, parameter values, etc). Software application 18 enables a method to calculate an evaluation score based on multiple metrics for source code files. The evaluation score is determined for each source code file and calculated employing an evaluation function. Parameter values for the evaluation function are calculated based on the source code file specified by a user. Parameter values giving a worst evaluation score concerning the source code file specified by the user are found with linear programming.

FIG. 2 illustrates a user interface 200 used to enable system 5 for inspecting source code and determining defects in the source code, in accordance with embodiments of the present invention. User interface 200 may be implemented and presented to a user via a display/monitor (e.g., LCD, CRT, Plasma, laser, etc) that is comprised by computing apparatus 8a. User interface 200 comprises a first display section 202, a second display section 204, and a third display section 208. First display section 202 comprises a graph 202a comprising an evaluation score (i.e., on the Y-axis) for each file (i.e., on the X-axis) of a project to be inspected. Second display section 204 comprises a graph 204a comprising an evaluation score (i.e., on the Y-axis) for each file (i.e., on the X-axis) of an inspected project aaa. Third display section 208 comprises an inspected project list 208a.

Software application 18 (of FIG. 1) performs the following functions associated with user interface 200:
1. A user may confirm source code files included in a project for inspection (or a project implemented in the past) using first display section 202 or second display section 204. For example, the user may select (e.g., by using a mouse to clicks any one of points 202b or 204b) a source code file. The selected source code file is called a reference source code file. Software application 18 enables a method to change parameter values for an evaluation function in response to a selected reference source code file.
2. First display section 202 and second display section 204 provides a function for selecting a reference source code file. When a source code file is selected, an editor is enabled.
3. A user may confirm the names of past projects (or their profiles) using third display section 208 and selects a project. The selected project is called a reference project. Based on all source code files included in the reference project, an evaluation function that is used for the target project for inspection is determined. Using linear programming, parameter values are found so that the sum of evaluation scores of all source code files included in the reference project will be the worst. By employing the evaluation function based on parameter values, an evaluation score of each source code file in the project targeted for inspection is calculated.

User interface 200 in combination with computing system 10 of FIG. 1 enables the following functions:
1. Displaying a list of inspected projects in third display section 208.
2. Determining parameter values for an evaluation function in accordance with a source code file specified by a user. The parameter values will generate a worst evaluation score of the source code file based on obtained metrics data.
3. Allowing a user to select a reference source code file by selecting one of points 202b or 204b indicating a source code file.
4. Determining parameter values for an evaluation function based on the reference source code file.
5. Calculating an evaluation score for each source code file of a project for inspection and a reference project and displaying results in the windows in first display section 202 and second display section 204.
6. Determining parameter values for an evaluation function in accordance with the reference project specified by the user. The parameter values are determined such that a sum of evaluation scores of all source code files included in the project will be the worst based on an obtained evaluation function and metrics data.
7. Allowing a user to select a reference project from display section 208.
8. Determining parameter values for an evaluation function based on source code files of the reference project.
9. Calculating an evaluation score for each source code file of the project for inspection and reference project.

The following example illustrates an implementation scenario for enabling a process for inspecting source code during software development:

In this example, it is assumed that a number of the source code files of the project for inspection are represented by I and K metrics are obtained for each source code file. $x_{i,1}, \ldots, x_{i,K}$ are given for K metrics of the source code file number i. It is additionally assumed that for each metric, the larger the value, the lower the quality. A relationship between an evaluation score $v_i$ of an $i_{th}$ source code file and metrics $x_{i,1}, \ldots, x_{i,K}$ is expressed by the following equation 1:

$$v_i = \sum_{k=1}^{K} a_k x_{i,k} + b \qquad \text{Equation 1}$$

Equation 1 (i.e., an evaluation function) is defined as a weighted sum of metrics and a constant. By changing values of parameters $a_1, \ldots, a_K, b$ (b is a constant), equation 1 expresses various evaluation functions (a linear expression). Alternatively, nonlinear relationships (e.g., a gradual increasing type, a gradual decreasing type, an S-shaped type) may be used. In this case (i.e., by appropriately changing a scale for metrics), they are expressed by a linear expression. In order to calculate parameter values for the evaluation function (i.e., equation 1), it is assumed that the user selects the $i_{0\,th}$ source code file as a reference source code file. In the following equation 2, the following constraint is introduced: an evaluation score of each source code file is 0 or more and 1 or less and based on the following equation 2, the values of parameters $a_1, \ldots, a_K$ for Equation 1 are calculated.

$$\max v_{i_0} = \max_{a_1,\ldots,a_K} \sum_{k=1}^{K} a_k x_{i_0,k} + b \quad \text{Equation 2}$$

$$\text{subject to } 0 \le v_i \le 1, \quad i = 1, \ldots, I$$

Equation 2 is used to determine values of parameters $a_1, \ldots, a_K$ so that the evaluation score of the reference source code file will be the maximum (i.e. the worst). After parameter values are calculated, an evaluation score $v_i$ for each source code file i (i.e., apart from the reference source code file) is calculated using equation 1. When the user specifies another reference source code file, values of parameters $a_1, \ldots, a_K$ are determined so that its evaluation score will comprise a maximum score. It may be interpreted that an evaluation equation obtained by means of these methods characterizes the defects of the reference source code file. Such an evaluation function may be obtained by a click operation on user interface 200. Each evaluation score for each source code file is calculated using Equation 1 and displayed via user interface 200.

In order to calculate parameter values, a set of source code file numbers comprises the following variables defined as follows:
1. A set R is defined as a collection of source code file numbers of a reference project selected by a user.
2. A set T is defined as a collection of source code file numbers of a project for inspection.
3. A number of source code files I is included in the project for inspection and therefore T={1, ..., I}. Where both the reference project and project for inspection are a combined a set of source code file numbers expressed as T∪R.

The following constraint (with respect to equation 3 below) is introduced: an evaluation score for each source code file is 0 or more and 1 or less and based on equation 3 below, the values of parameters $a_1, \ldots, a_K$ for Equation 1 are calculated.

$$\max v_{i_0} = \max_{a_1,\ldots,a_K} \sum_{k=1}^{K} a_k x_{i_0,k} + b \quad \text{Equation 3}$$

$$\text{subject to } 0 \le v_i \le 1, \quad i = 1, \ldots, I$$

Equation 3 is used to calculate values of parameters $a_1, \ldots, a_K$ so that the sum of evaluation scores in the reference project will be a maximum (i.e. the worst). After parameter values are calculated, an evaluation score $v_i$ for each source code file i of the reference project is determined by using Equation 1. When the user specifies another reference project, values of parameters $a_1, \ldots, a_K$ are determined so that the sum of its evaluation scores will comprise a maximum.

Figure 3:
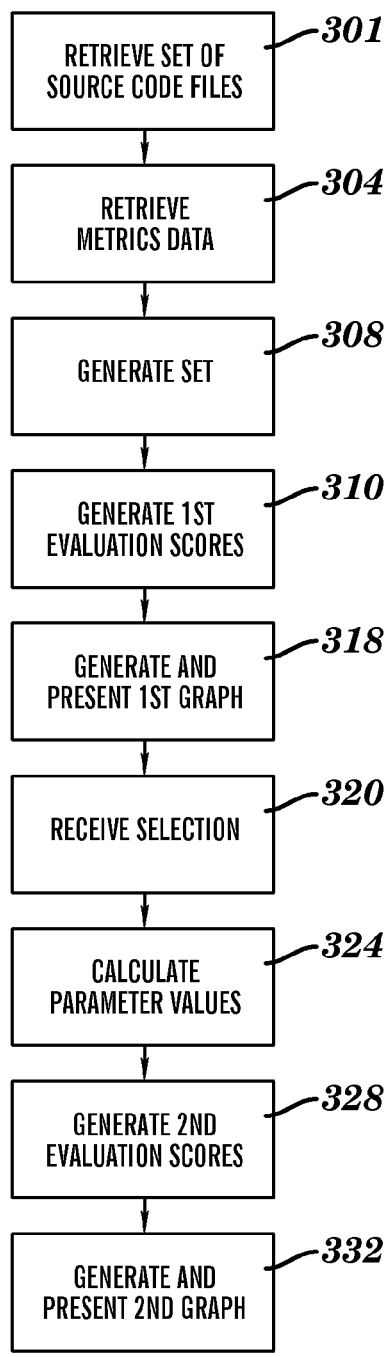
FIG. 3 illustrates a flowchart describing an algorithm used by the system of FIG. 1 for implementing a first method for inspecting source code during software development, in accordance with embodiments of the present invention.

FIG. 3 illustrates a flowchart describing an algorithm used by system 5 of FIG. 1 for implementing a first method for inspecting source code during software development, in accordance with embodiments of the present invention. In step 301, a computing system (e.g., computing system 10 of FIG. 1), receives a set of source code files associated with a specified project. In step 304, the computing system retrieves metrics data comprising software metrics associated with the source code files. In step 308, the computing system generates a set comprising the software metrics data. In step 310, the computing system generates (or calculates) based on the software metrics, first evaluation scores $1^{st}$ ($v_i$) associated with a source code file i. The first evaluation scores $1^{st}$ ($v_i$) may be generated by normalizing the value of an average of the software metrics by enabling the following equation 4:

$$v'_i = \frac{1}{K} \sum_{k=1}^{K} x_{i,k} \quad \text{Equation 4}$$

$$v_i = (\text{normalized } v'_i \text{ so that } 0 \le v_i \le 1)$$

In equation 4, K equals a number of software metrics, k equals a number of iterations enabled for retrieving the metrics data, x is a metric, $v'_i$ is the average of the metrics, and $v_i$ is a first evaluation score.

In step 318, the computing system generates a first graph displaying the first evaluation scores (e.g., see graph 202a in FIG. 2) and presents the first graph to a user. In step 320, the computing system receives from the user in response to presenting the first graph, a selection of a first source code file of the source code files. In step 324, the computing system calculates (i.e., based on the first source code file) parameter values associated with an evaluation function used to calculate second evaluation scores associated with the source code files. An objective function for calculating values for parameters $a_1, \ldots, a_K$ comprises the following objective function (i.e., equation 2 as described with respect to FIG. 2):

$$\max v_{i_0} = \max_{a_1,\ldots,a_K} \sum_{k=1}^{K} a_k x_{i_0,k} + b.$$

The objective function comprises a linear objective function and a set of linear inequality constraints. The linear objective function is configured to be solved by a linear programming technique as follows:

The objective of the linear objective function is to find the value of parameters $a_1, \ldots, a_K$ of equation 1 as described with respect to FIG. 2. Given software metrics $x_{i_0,1}, \ldots, x_{i_0,K}$ from the (first) reference source code file $i_0$, the objective function is: $a_1 x_{i_0,1} + \ldots + a_K x_{i_0,K}$. Maximizing the objective function: $a_1 x_{i_0,1} + \ldots + a_K x_{i_0,K}$ determines that the evaluation score $v_{i_0}$ of the reference source code file $i_0$ is maximized under the following constraints:
There are I+K constraints so that the evaluation scores of all source code files are between zero and 1 as follows:

$$a_1 x_{1,1} + \ldots + a_K x_{1,K} \le 1 - b,$$

$$a_1 x_{2,1} + \ldots + a_K x_{2,K} \le 1 - b,$$

$$\ldots$$

-continued $$a_1 x_{I,1} + \ldots + a_K x_{I,K} \leq 1 - b,$$

$$a_1 \geq 0,$$

$$a_2 \geq 0,$$

$$\ldots$$

$$a_K \geq 0.$$

b is a constant value where $0 \leq b < 1$ holds. Finding values of parameters $a_1 \ldots a_K$ so that the objective function: $a_1 x_{i_0,1} + \ldots + a_K x_{i_0,K}$ is maximized under the aforementioned constraints is solved by a linear programming technique.

In step 328, the computing system calculates second evaluation scores by enabling an evaluation function (i.e., equation 1 as described with respect to FIG. 2) using the parameter values. The evaluation function comprises:

$$v_i = \sum_{k=1}^{K} a_k x_{i,k} + b,$$

where:
1. $v_i$ equals each evaluation score of the second evaluation scores.
2. $0 \leq v_i \leq 1$
3. K equals a number of the software metrics.
4. k equals a number of iterations enabled for retrieving the metrics data.
5. $a_k$ equals each parameter value of the parameter values.
6. $x_{i,k}$ equals the software metrics
7. b equals a constant (i.e., where $0 \leq b < 1$).

In step 332, the computing system generates and presents a second graph displaying the second evaluation scores (e.g., see graph 202b in FIG. 2).

Figure 4:
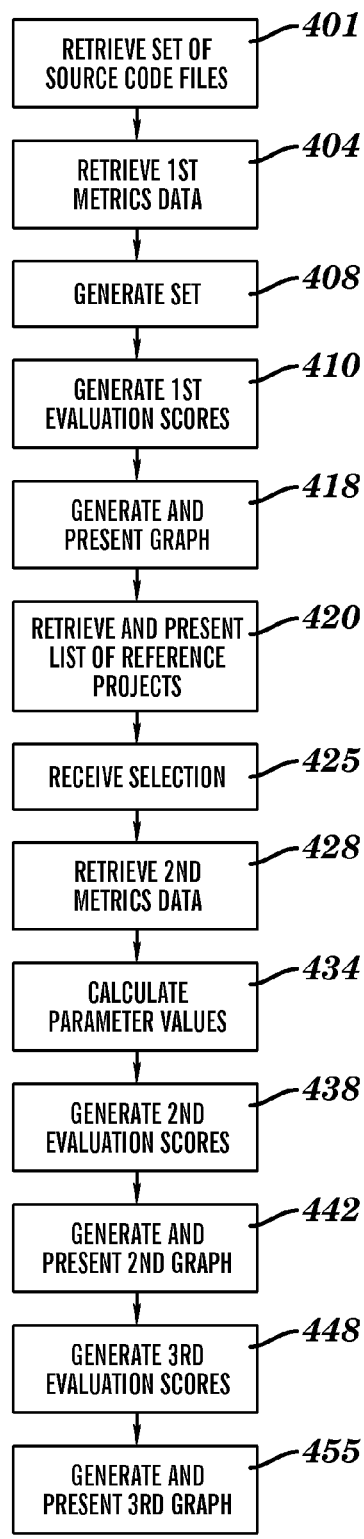
FIG. 4 illustrates a flowchart describing an algorithm used by the system of FIG. 1 for implementing a second method for inspecting source code during software development, in accordance with embodiments of the present invention.

FIG. 4 illustrates a flowchart describing an algorithm used by system 5 of FIG. 1 for implementing a second method for inspecting source code during software development, in accordance with embodiments of the present invention. In step 401, a computing system (e.g., computing system 10 of FIG. 1), receives a first set of source code files associated with a specified project. In step 404, the computing system retrieves first metrics data comprising first software metrics associated with the first source code files. In step 408, the computing system generates a first set comprising the first software metrics. In step 410, the computing system generates based on the first software metrics, first evaluation scores $1^{st}$ ($v_i$) associated with a source code file i. The first evaluation scores $1^{st}$ ($v_i$) may be generated by normalizing the value of an average of the software metrics by enabling the following equation 4:

$$v'_i = \frac{1}{K} \sum_{k=1}^{K} x_{i,k} \qquad \text{Equation 4}$$

$$v_i = (\text{normalized } v'_i \text{ so that } 0 \leq v_i \leq 1)$$

In equation 4, K equals a number of the first software metrics, k equals a number of iterations enabled for retrieving the first metrics data, x is a metric, $v'_i$ is the average of the metrics, and $v_i$ is a first evaluation score.

In step 418, the computing system generates a first graph displaying the first evaluation scores (e.g., see graph 202a in FIG. 2) and presents the first graph to a user. In step 420, the computing system retrieves a list of reference projects and presents the list of reference projects to the user. In step 425, the computing system receives (i.e., from the user in response to step 420) a selection for a first reference project of the list of reference projects. In step 428, the computing system retrieves second metrics data comprising second software metrics associated with second source code files associated with the first reference project. In step 434, the computing system calculates (i.e., based on the second source code files) parameter values associated with an evaluation function used to calculate second evaluation scores and third evaluation scores associated with the first source code files and the second source code files. The parameter values are calculated using an objective function for calculating values for parameters $a_1, \ldots, a_K$. The objective function comprises the following equation 3 as described with respect to FIG. 2:

$$\max \sum_{i \in R} v_i = \max_{a_1, \ldots, a_K} \sum_{i \in R} \left( \sum_{k=1}^{K} a_k x_{i,k} + b \right).$$

The evaluation function maximizes a sum of evaluation scores $$\sum_{i \in R} v_i$$

of the second source files associated with the first reference project. The objective function comprises a linear objective function and a set of linear inequality constraints. The linear objective function is configured to be solved by a linear programming technique as described with reference to FIG. 3. In step 442, the computing system generates and presents a second graph displaying the second evaluation scores (e.g., see graph 202b in FIG. 2). In step 448, computing system generates the third evaluation scores by enabling the evaluation function using the parameter values and the first software metrics. In step 455, the computing system generates and presents a third graph displaying the third evaluation scores.

Figure 5:
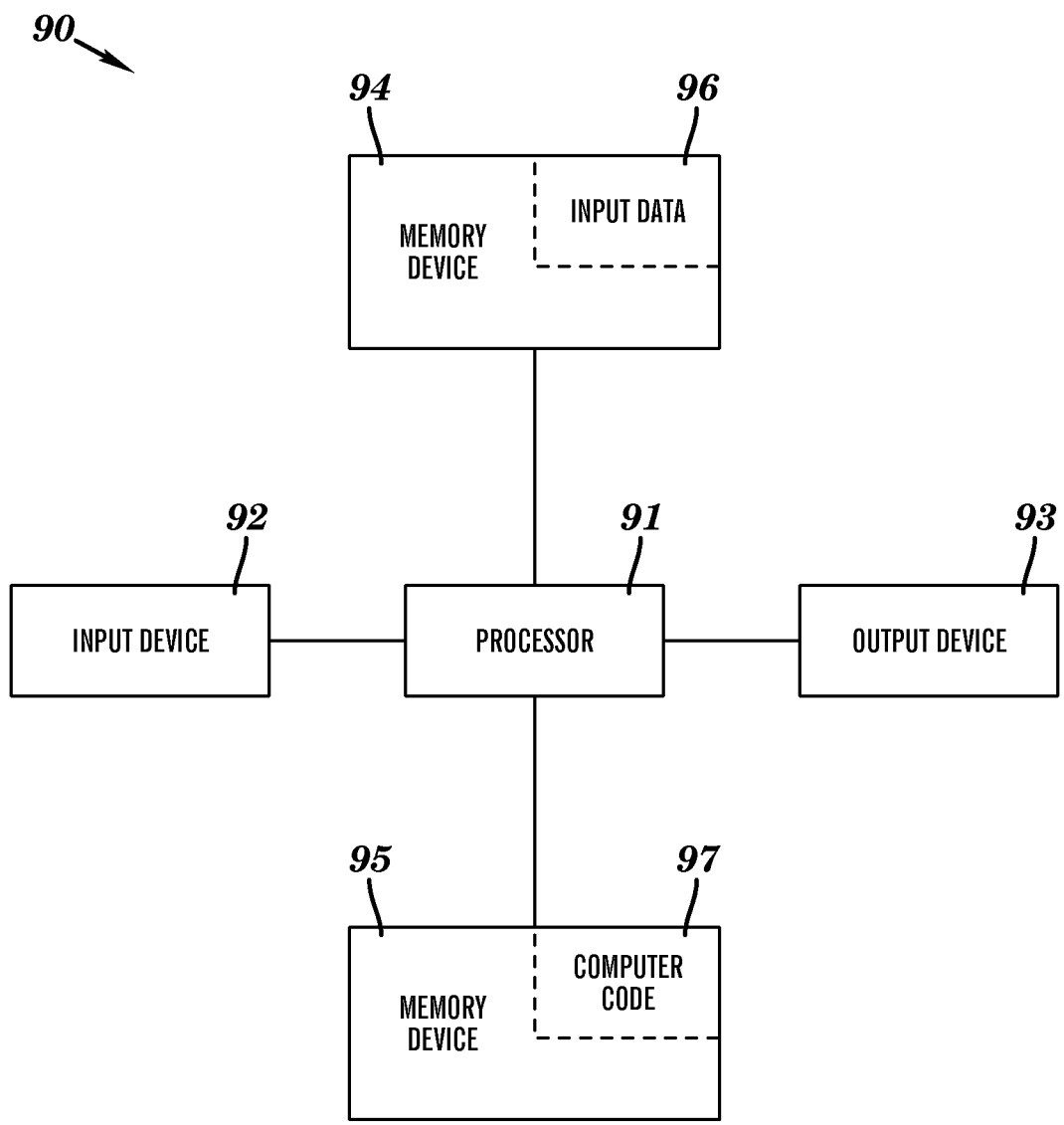
FIG. 5 illustrates a computer apparatus used for inspecting source code during software development, in accordance with embodiments of the present invention.

FIG. 5 illustrates a computer apparatus 90 (e.g., computing system 10 of FIG. 1) used for inspecting source code during software development, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for inspecting source code during software development. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5)

may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for inspect source code during software development. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for inspecting source code during software development. In another embodiment, the invention provides a method that performs the process steps of the invention on a subscription, advertising, and/or fee basis. That is, a service provider, such as a Solution Integrator, could offer to inspect source code during software development. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   receiving, by a computing system, a set of source code files associated with a specified project;
   retrieving, by said computing system, metrics data comprising software metrics associated with said source code files;
   generating, by said computing system, a set comprising said software metrics;
   generating, by said computing system based on said software metrics, first evaluation scores associated with said source code files;
   generating, by said computing system, a first graph displaying said first evaluation scores;
   first presenting, by said computing system to a user said first graph;
   receiving, by said computing system from said user in response to said first presenting, a selection of a first source code file of said source code files;
   calculating, by said computing system based on said first source code file, parameter values associated with an evaluation function used to calculate second evaluation scores associated with said source code files, wherein said evaluation function comprises:

$$v_i = \sum_{k=1}^{K} a_k x_{i,k} + b,$$

wherein $v_i$ equals each evaluation score of said second evaluation scores, wherein $0 \leq v_i \leq 1$, wherein K equals a number of said software metrics, wherein k equals a number of iterations enabled for said retrieving said metrics data, wherein $a_k$ equals each parameter value of said parameter values, wherein $x_{i,k}$ equals said software metrics, and wherein b equals a constant, and wherein $0 \leq b < 1$;
   generating, by a computer processor of said computing system, said second evaluation scores, wherein said generating said second evaluation scores comprises enabling said evaluation function using said parameter values;
   generating, by said computing system, a second graph displaying said second evaluation scores; and
   second presenting, by said computing system to said user, said second graph.

2. The method of claim 1, further comprising:
   normalizing, by said computing system, said first evaluation scores such that each evaluation score comprises a value between zero and one.

3. The method of claim 1, wherein an objective function for calculating values for parameters $a_1, \ldots, a_K$ comprises:

$$\max v_{i_0} = \max_{a_1, \ldots, a_K} \sum_{k=1}^{K} a_k x_{i_0,k} + b,$$

wherein said evaluation function maximizes an evaluation score $v_{i_0}$ of a reference source code file $i_0$, wherein said objective function comprises a linear objective function and a set of linear inequality constraints, and wherein said linear objective function is configured to be solved by a linear programming technique.

4. The method of claim 1, wherein said software metrics comprise measures of properties of said source code files.

5. The method of claim 1, wherein said software metrics comprise specifications of said source code files.

6. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

7. A computer program product, comprising a computer hardware storage device storing a computer readable program code, said computer readable program code configured to perform the method of claim 1 upon being enabled by a processor of said computing system.

8. A computing system comprising a processor coupled to a computer-readable memory unit, said memory unit comprising a computer readable code configured to be enabled by the processor to perform the method of claim 1.

9. A method comprising:
   receiving, by a computing system, a first set of source code files associated with a specified project;
   retrieving, by said computing system, first metrics data comprising first software metrics associated with said first source code files;

generating, by said computing system, a first set comprising said first software metrics;

generating, by said computing system, first evaluation scores associated with said first source code files;

generating, by said computing system, a first graph displaying said first evaluation scores;

first presenting, by said computing system to a user said first graph;

retrieving, by said computing system, a list of reference projects;

second presenting, by said computing system to said user, said list of reference projects;

receiving, by said computing system from said user in response to said second presenting, a selection for a first reference project of said list of reference projects;

retrieving, by said computing system, second metrics data comprising second software metrics associated with second source code files associated with said first reference project;

generating, by said computing system based on said second source code files associated with said first reference project, parameter values associated with an evaluation function used to calculate second evaluation scores and third evaluation scores associated with said first source code files and said second source code files;

generating, by a computer processor of said computing system, said second evaluation scores, wherein said generating said second evaluation scores comprises enabling an evaluation function using said parameter values and said second software metrics, wherein said evaluation function comprises:

$$v_i = \sum_{k=1}^{K} a_k x_{i,k} + b,$$

wherein $v_i$ equals each evaluation score of said third evaluation scores, wherein $0 \leq v_i \leq 1$, wherein K equals a number of said first software metrics, wherein k equals a number of iterations enabled for said retrieving said first metrics data, wherein $a_k$ equals each parameter value of said parameter values, wherein $x_{i,k}$ equals said first software metrics, and wherein b equals a constant, and wherein $0 \leq b < 1$;

generating, by said computing system, a second graph displaying said second evaluation scores; and third presenting, by said computing system to said user, said second graph.

10. The method of claim 9, further comprising:

generating, by a computer processor of said computing system, said third evaluation scores, wherein said generating said third evaluation scores comprises enabling said evaluation function using said parameter values and said first software metrics;

generating, by said computing system, a third graph displaying said third evaluation scores; and fourth presenting, by said computing system to said user, said third graph.

11. The method of claim 9, further comprising:

normalizing, by said computing system, said first evaluation scores such that each evaluation score comprises a value between zero and one.

12. The method of claim 9, wherein an objective function for calculating values for parameters $a_1, \ldots, a_K$ comprises:

$$\max \sum_{i \in R} v_i = \max_{a_1, \ldots, a_K} \sum_{i \in R} \left( \sum_{k=1}^{K} a_k x_{i,k} + b \right),$$

wherein said evaluation function maximizes a sum of evaluation scores $$\sum_{i \in R} v_i$$

of said second source files associated with said first reference project, wherein said objective function comprises a linear objective function and a set of linear inequality constraints, and wherein said linear objective function is configured to be solved by a linear programming technique.

13. The method of claim 9, wherein said first software metrics comprise measures of properties of said first source code files, and wherein said second software metrics comprise measures of properties of said second source code files.

14. The method of claim 9, wherein said first software metrics comprise specifications of said first source code files, and wherein said second software metrics comprise specifications of said second source code files.

15. A process for supporting computer infrastructure, said process comprising providing at least one support service for at least one of creating, integrating, hosting, maintaining, and deploying computer-readable code in said computing system, wherein the code in combination with said computing system is capable of performing the method of claim 9.

16. A computer program product, comprising a computer hardware storage device storing a computer readable program code, said computer readable program code configured to perform the method of claim 9 upon being enabled by a processor of said computing system.

17. A computing system comprising a processor coupled to a computer-readable memory unit, said memory unit comprising a computer readable code configured to be enabled by the processor to perform the method of claim 9.

18. A method comprising:

receiving, by a computing system, a first set of source code files associated with a specified project;

retrieving, by said computing system, first metrics data comprising first software metrics associated with said first source code files;

generating, by said computing system, a first set comprising said first software metrics;

generating, by said computing system, first evaluation scores associated with said first source code files;

generating, by said computing system, a first graph displaying said first evaluation scores;

first presenting, by said computing system to a user said first graph;

retrieving, by said computing system, a list of reference projects;

second presenting, by said computing system to said user, said list of reference projects;

receiving, by said computing system from said user in response to said second presenting, a selection for a first reference project of said list of reference projects;

retrieving, by said computing system, second metrics data comprising second software metrics associated with second source code files associated with said first reference project;

generating, by said computing system based on said second source code files associated with said first reference project, parameter values associated with an evaluation function used to calculate second evaluation scores and third evaluation scores associated with said first source code files and said second source code files;

generating, by a computer processor of said computing system, said second evaluation scores, wherein said generating said second evaluation scores comprises enabling an evaluation function using said parameter values and said second software metrics, wherein said evaluation function comprises:

$$v_i = \sum_{k=1}^{K} a_k x_{i,k} + b,$$

wherein $v_i$ equals each evaluation score of said second evaluation scores, wherein $0 \leq v_i \leq 1$, wherein K equals a number of said second software metrics, wherein k equals a number of iterations enabled for said retrieving said second metrics data, wherein $a_k$ equals each parameter value of said parameter values, wherein $x_{i,k}$ equals said second software metrics, and wherein b equals a constant, and wherein $0 \leq b < 1$;

generating, by said computing system, a second graph displaying said second evaluation scores; and third presenting, by said computing system to said user, said second graph.

* * * * *